United States Patent
Kasahara

(10) Patent No.: US 9,836,263 B2
(45) Date of Patent: Dec. 5, 2017

(54) DISPLAY CONTROL DEVICE, DISPLAY CONTROL METHOD, AND PROGRAM

(75) Inventor: Shunichi Kasahara, Kanagawa (JP)

(73) Assignee: Sony Corporation, Tokyo (JP)

( * ) Notice: Subject to any disclaimer, the term of this patent is extended or adjusted under 35 U.S.C. 154(b) by 388 days.

(21) Appl. No.: 13/435,967

(22) Filed: Mar. 30, 2012

(65) Prior Publication Data

US 2012/0256956 A1 Oct. 11, 2012

(30) Foreign Application Priority Data

Apr. 8, 2011 (JP) .................................. 2011-086679

(51) Int. Cl.
| | |
|---|---|
| G09G 5/00 | (2006.01) |
| G06F 3/14 | (2006.01) |
| G06F 3/0481 | (2013.01) |
| G06T 19/00 | (2011.01) |
| G06T 19/20 | (2011.01) |
| G06K 9/00 | (2006.01) |
| G06T 7/73 | (2017.01) |

(52) U.S. Cl.
CPC ............ *G06F 3/14* (2013.01); *G06F 3/04815* (2013.01); *G06K 9/00671* (2013.01); *G06T 7/73* (2017.01); *G06T 19/006* (2013.01); *G06T 19/20* (2013.01); *G06T 2219/2004* (2013.01)

(58) Field of Classification Search
None
See application file for complete search history.

(56) References Cited

U.S. PATENT DOCUMENTS

| | | | |
|---|---|---|---|
| 6,661,426 B1 | 12/2003 | Jetha et al. | |
| 2005/0174361 A1* | 8/2005 | Kobayashi et al. | .......... 345/633 |
| 2005/0231532 A1 | 10/2005 | Suzuki et al. | |
| 2010/0156893 A1 | 6/2010 | Mihara et al. | |
| 2010/0177931 A1 | 7/2010 | Whytock et al. | |
| 2012/0113141 A1* | 5/2012 | Zimmerman et al. | ........ 345/633 |
| 2012/0218263 A1* | 8/2012 | Meier et al. | .................. 345/419 |

FOREIGN PATENT DOCUMENTS

| | | |
|---|---|---|
| EP | 1014257 | 6/2000 |
| EP | 2509048 | 10/2012 |

OTHER PUBLICATIONS

Jul. 10, 2013, EU communication issued for related EU application No. 12162153.6.
Dec. 1, 2015, Chinese Office Action for related CN Application No. 2015112601287810.

* cited by examiner

*Primary Examiner* — Yi Wang
(74) *Attorney, Agent, or Firm* — Paratus Law Group, PLLC

(57) ABSTRACT

Aspects of the present invention include a display control device comprising a determining unit configured to determine an orientation of a real object in a real space image. The device may also comprise a control unit configured to select between first and second orientations of a virtual object based on the real object orientation, one of the first or second virtual object orientations aligning the virtual object with the orientation of the real object, and output an image of the virtual object based on the selected orientation, for display on an associated display device.

19 Claims, 19 Drawing Sheets

FIG. 6
<FRONT-FACING STATE>
(PLAN VIEW)
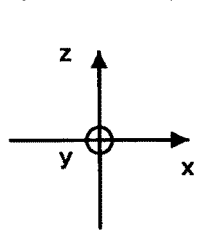
(REAL SPACE IMAGE)
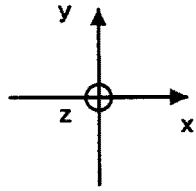
(SIDE VIEW) 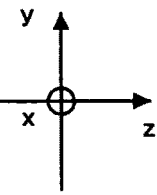

FIG. 7
<NON-FRONT-FACING STATE>
(PLAN VIEW)
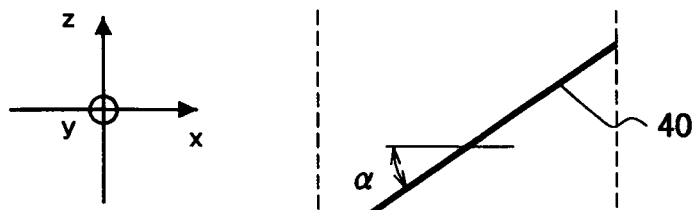
(REAL SPACE IMAGE)
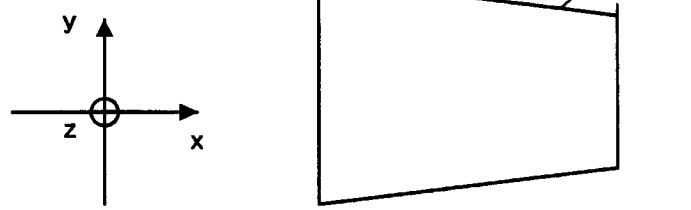

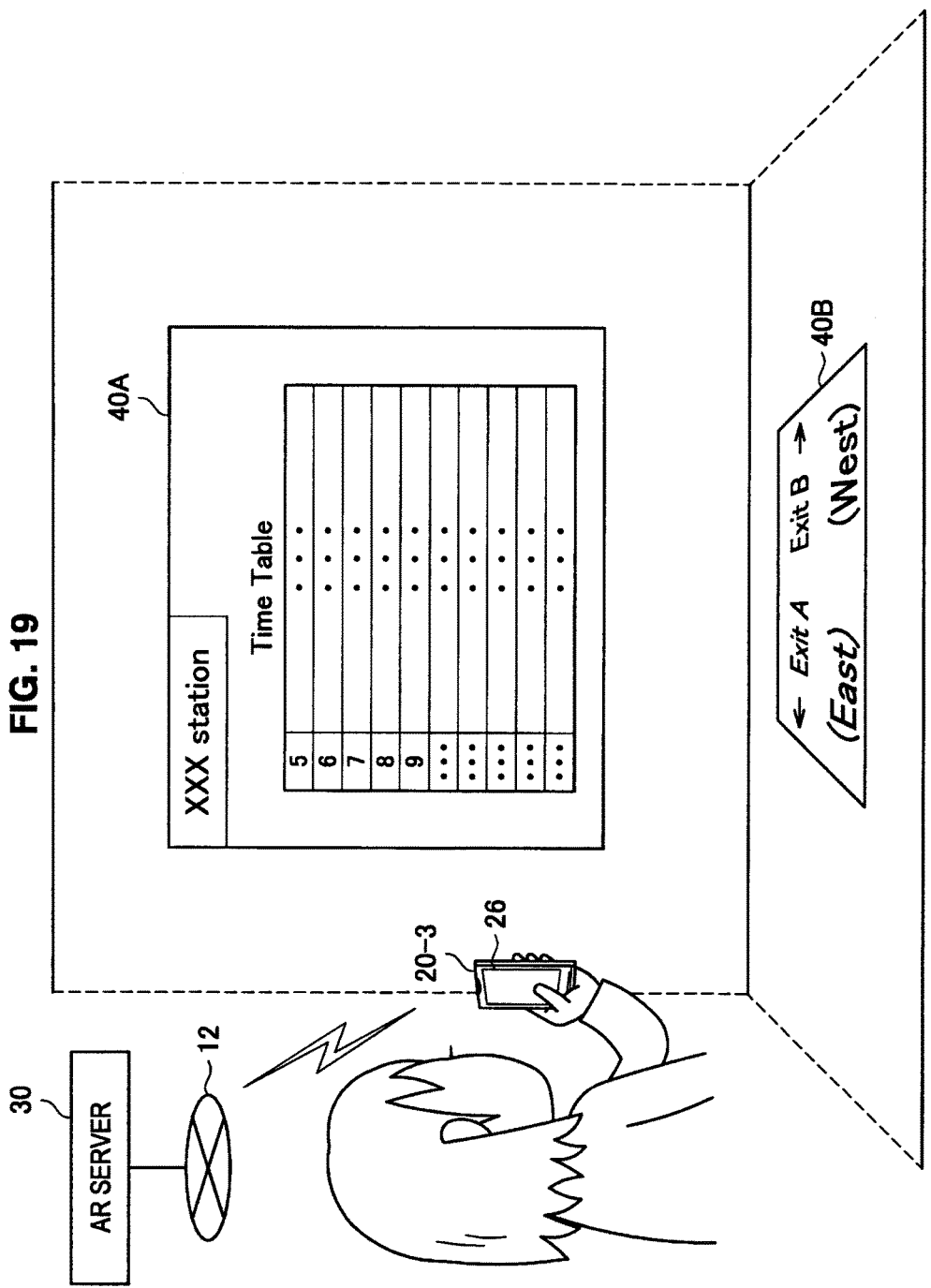

DISPLAY CONTROL DEVICE, DISPLAY CONTROL METHOD, AND PROGRAM

RELATED APPLICATION

The present disclosure contains subject matter related to that disclosed in Japanese Priority Patent Application JP 2011-086679 filed in the Japan Patent Office on Apr. 8, 2011, the entire content of which is hereby incorporated by reference.

BACKGROUND

The present disclosure relates to a display control device, a display control method, and a program.

Image recognition technology has become more advanced recently, enabling recognition of the position or posture of a real object (e.g., an object such as a sign board or building) contained in an input image from an imaging device. As one application example of such object recognition, an AR (Augmented Reality) application is known. According to the AR application, it is possible to superimpose a virtual object (e.g., advertising information, navigation information, or information for a game) associated with a real object onto the real object contained in a real space image. Note that the AR application is disclosed in Japanese Unexamined Patent Application Publication No. 2010-49158, for example.

However, the virtual object tends to be added to the real object in a uniform posture relative to the real object. Therefore, the visibility of the virtual object is impaired in some cases depending on the posture of the real object.

SUMMARY

In light of the foregoing, the present disclosure proposes a novel and improved display control device, display control method and program that enable improvement of the visibility of a virtual object.

Aspects of the present invention include a display control device comprising a determining unit configured to determine an orientation of a real object in a real space image. The device may also comprise a control unit configured to select between first and second orientations of a virtual object based on the real object orientation, one of the first or second virtual object orientations aligning the virtual object with the orientation of the real object, and output an image of the virtual object based on the selected orientation, for display on an associated display device.

Aspects of the present invention further include a method comprising determining unit an orientation of a real object in a real space image. The method may further comprise selecting between first and second orientations of a virtual object based on the real object orientation, one of the first or second virtual object orientations aligning the virtual object with the orientation of the real object, and outputting an image of the virtual object based on the selected orientation, for display on an associated display device.

Aspects of the present invention further include a tangibly embodied non-transitory computer-readable medium storing instructions which, when executed by a processor, perform a method comprising determining unit an orientation of a real object in a real space image, selecting between first and second orientations of a virtual object based on the real object orientation, one of the first or second virtual object orientations aligning the virtual object with the orientation of the real object, and outputting an image of the virtual object based on the selected orientation, for display on an associated display device.

As described above, the display control device, the display control method and the program according to embodiments of the present disclosure enable improvement of the visibility of a virtual object.

BRIEF DESCRIPTION OF THE DRAWINGS

FIG. 6 is an explanatory view showing a front-facing state of a real object;

FIG. 7 is a view showing a state where a plane of a real object has rotated around the y-axis;

FIG. 19 is a view showing a configuration of an AR system according to a third embodiment of the present disclosure.

DETAILED DESCRIPTION OF THE EMBODIMENT(S)

Figure 1:
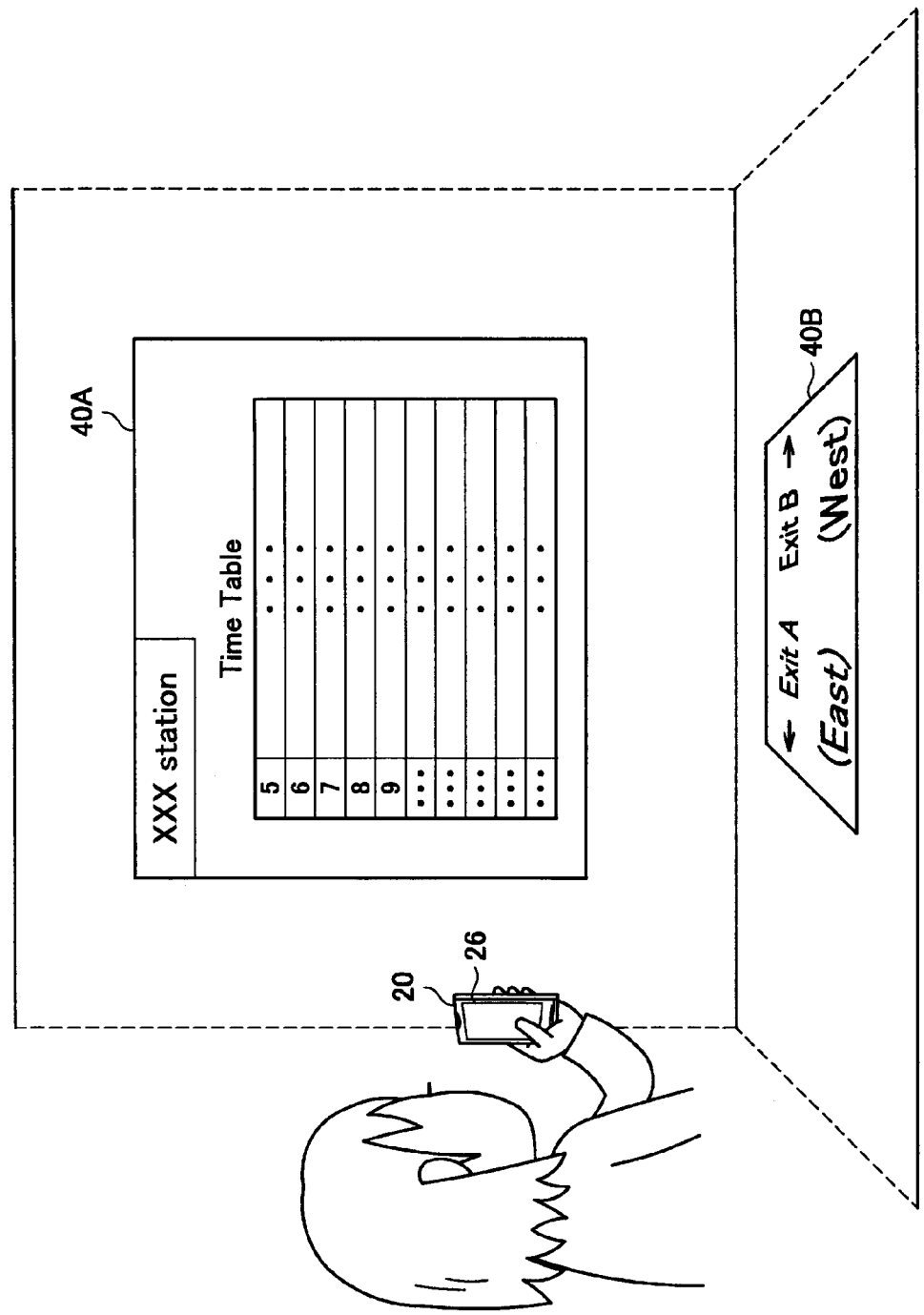
FIG. 1 is an explanatory view showing a configuration of an AR system according to the present disclosure.

Hereinafter, embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

In this specification and the drawings, each of a plurality of structural elements having substantially the same function is distinguished by affixing a different alphabetical letter to the same reference numeral in some cases. However, when there is no particular need to distinguish between a plurality of structural elements having substantially the same function, they are denoted only by the same reference numeral.

Further, "Description of Embodiments" will be provided in the following order.

1. Overview of AR System
2. Description of Embodiments
2-1. First Embodiment
2-2. Second Embodiment
2-3. Third Embodiment
3. Summary

1. Overview of AR System

The AR system according to the present disclosure may be implemented in various embodiments as described in detail in "2-1. First Embodiment" to "2-3. Third Embodiment" by way of illustration. Further, a display control device (mobile terminal 20, AR server 30) that constitutes the AR system according to each embodiment may include:

A. a control unit (241, 242) that may control display of a virtual object corresponding to a real object contained in a real space image, and B. the control unit may change the posture (or, equivalently, "orientation") of the virtual object relative to the real object depending on the posture of the real object in the real space image.

Hereinafter, a basic configuration of the AR system common to each of the embodiments is described firstly by reference to FIGS. 1 and 2.

FIG. 1 is a view showing a configuration of an AR system according to the present disclosure. As shown in FIG. 1, the AR system according to the present disclosure may include a mobile terminal 20 having an imaging function. The mobile terminal 20 may capture a real space image, add a virtual object corresponding to a real object contained in the real space image to the real space image, and display the real space image with the virtual object added on a display 26.

For example, when the real object captured by the mobile terminal 20 is a time table 40A showing train times as shown in FIG. 1, the mobile terminal 20 can display a real space image to which a virtual object corresponding to the time table 40A is added on the display 26. The real space image to which the virtual object is added is specifically described hereinafter by reference to FIG. 2.

Figure 2:
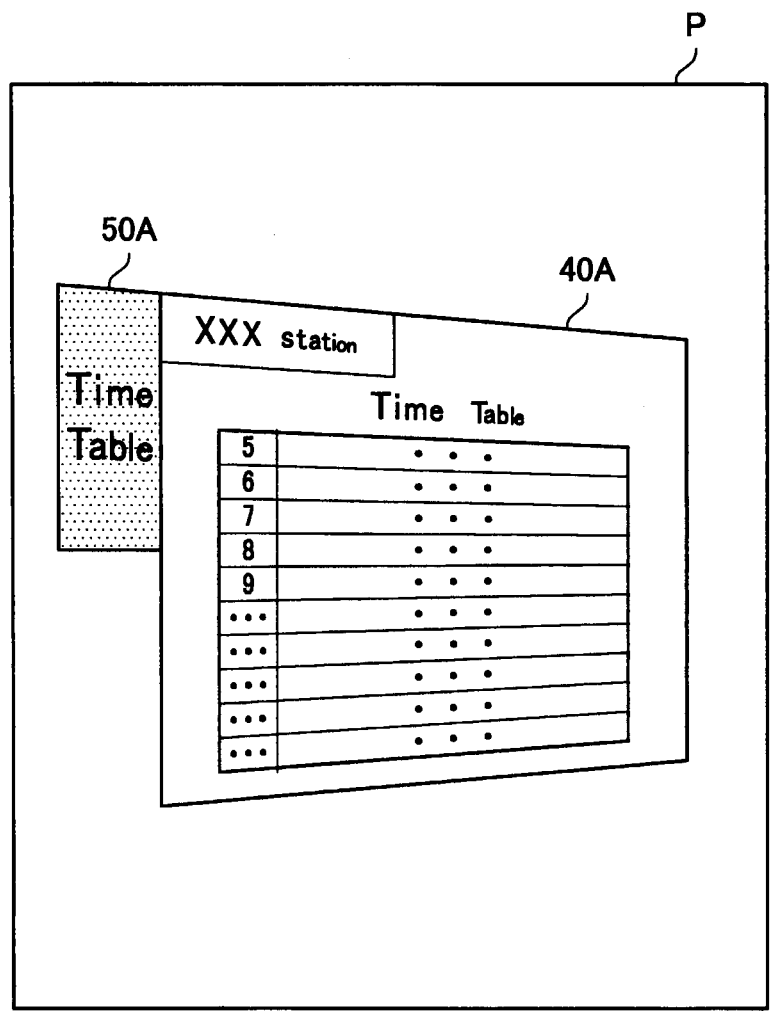
FIG. 2 is an explanatory view showing a specific example of a real space image to which a virtual object is added.

FIG. 2 is a view showing an example of a real space image to which a virtual object is added. As shown in FIG. 2, a real space image P contains the time table 40A, which is a real object, and a label graphic 50A, which is a virtual object, added to the time table 40A. As shown in FIG. 2, the label graphic 50A may be added on the same plane as the time table 40A, for example. By looking at the real space image with the virtual object added, a user may be informed of information which is not directly obtainable from the real space (in the case of FIG. 2, information indicating that the real object is a time table, for example).

Further, a user can change display of the virtual object contained in the real space image by conducting an operation on the display screen. For example, when a plurality of virtual objects is associated with one real object, the mobile terminal 20 may switch the virtual object to be displayed among the plurality of virtual objects according to, for example, a user operation. To be more specific, when the label graphic 50A and a virtual object showing an area map are associated with the time table 40A, the mobile terminal 20 may superimpose the virtual object showing the area map onto the display of the time table 40A according to a user operation.

Note that, when a plurality of virtual objects are associated with one real object as described above, the mobile terminal 20 may add a label graphic, such as a tab graphic, for example, that identifies the associated virtual object to the real object. For example, the mobile terminal 20 may add a tab graphic containing text information "area map" to the time table 40A, in addition to the label graphic 50A.

Although the time table 40A posted on the wall is described above as an example of the real object, an exit guide 40B placed on the floor shown in FIG. 1 may be treated in the same manner as the real object. Further, the real object may be an object such as a sign board, a building, a vehicle, a food product or a toy, or an identification pattern such as a QR code or an AR marker.

Further, although a smart phone is shown as an example of the mobile terminal 20 in FIG. 1, the mobile terminal 20 is not limited to the smart phone. For example, the mobile terminal 20 may be a PDA (Personal Digital Assistants), a mobile telephone, a portable music playback device, a portable video processing device, or a portable game machine or a number of other suitable devices with display capability. Further, the mobile terminal 20 is just an example of a display control device, and the display control device may be a server installed on the network side.

Incidentally, when the above-described label graphic 50 is added on the same plane as the real object 40, the visibility and operability of the label graphic 50 are impaired in some cases. For example, when the label graphic 50' is added on the same plane as the time table 40A in the case where the angle between the plane forming the time table 40A and the imaging optical axis of the real space image is small, the display of the label graphic 50' is small due to a large inclination, which degrades the visibility. Further, when the label graphic 50' includes an area that accepts a user operation, the operation determination area significantly decreases if the display of the label graphic 50' is small.

According to the embodiments of the disclosure, it is possible to improve the visibility and operability of the virtual object. Hereinafter, following the description of the hardware configuration of the mobile terminal 20 by reference to FIG. 4, the embodiments of the present disclosure are sequentially described in detail.

(Hardware Configuration of Mobile Terminal)

Figure 3:
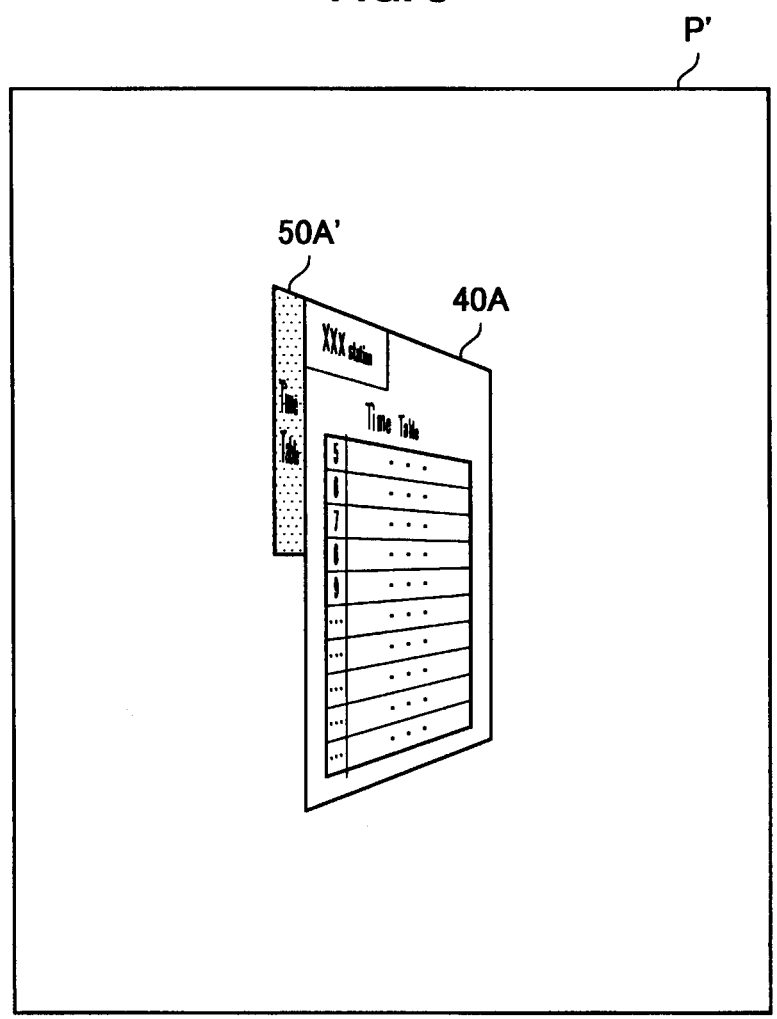
FIG. 3 is an explanatory view showing a comparative example of the present disclosure.
Figure 4:
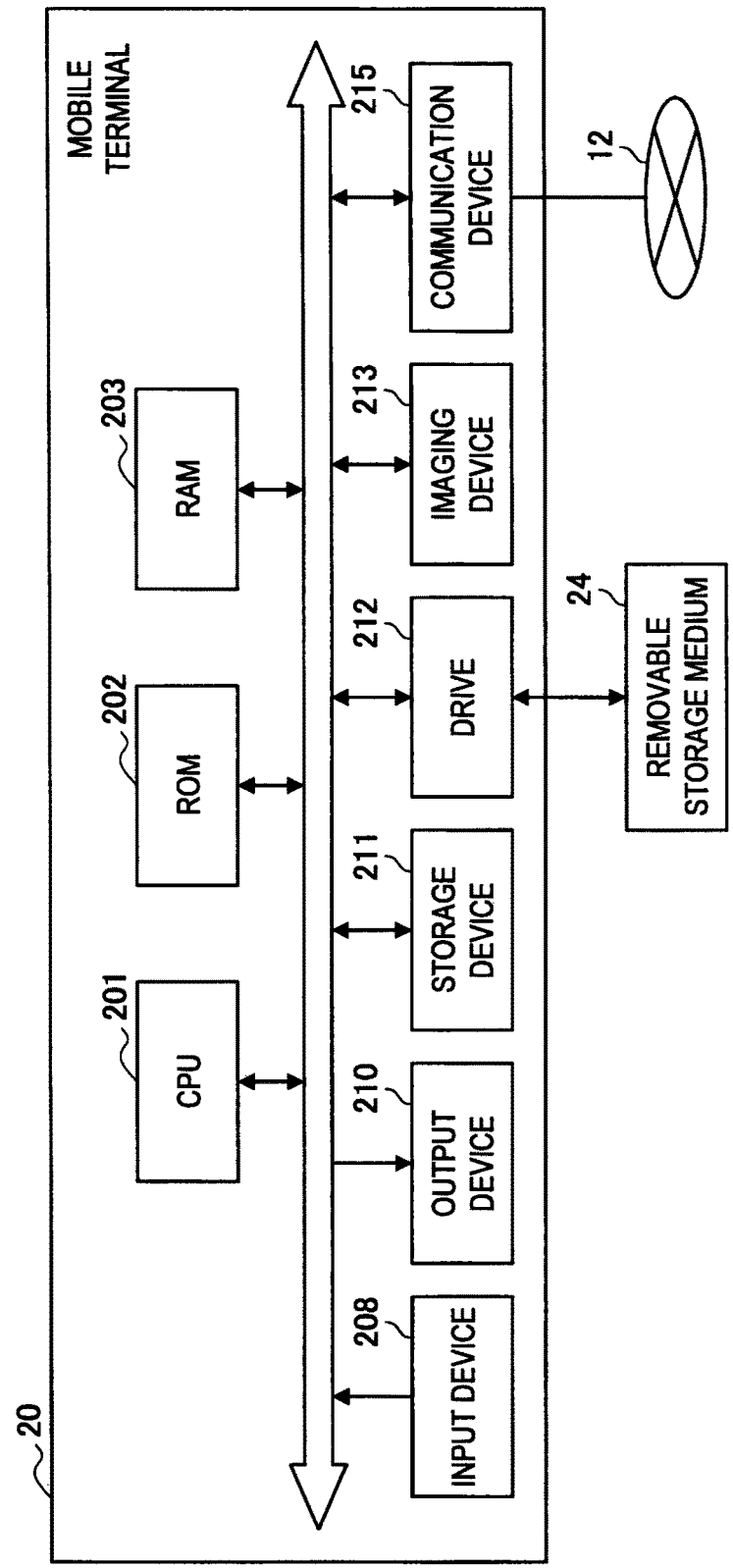
FIG. 4 is an explanatory view showing a hardware configuration of a mobile terminal.

FIG. 4 is a view showing the hardware configuration of the mobile terminal 20. As shown in FIG. 3, the mobile terminal 20 may include a CPU (Central Processing Unit) 201, a ROM (Read Only Memory) 202, a RAM (Random Access Memory) 203, an input device 208, an output device 210, a storage device 211, a drive 212, an imaging device 213, and a communication device 215.

The CPU 201 serves as a processing device and a control device, and it controls the overall operations in the mobile terminal 20 according to various kinds of programs. The CPU 201 may be a microprocessor. The ROM 202 stores a program to be used by the CPU 201, processing parameters and the like. The RAM 203 temporarily stores a program to be used in the execution on the CPU 201, parameters that vary in the execution and the like. The CPU 201, the ROM 202 and the RAM 203 are connected through the host bus, which may be a CPU bus and the like.

The input device 208 may be composed of an input means for a user to input information, such as a mouse, a keyboard, a touch panel, a button, a microphone, a switch or a lever, and an input control circuit that generates an input signal based on a user input and outputs it to the CPU 201, for example. A user of the mobile terminal 20 may manipulate the input device 208 to thereby input various kinds of data or direct a processing operation to the mobile terminal 20.

The output device 210 may include a display device such as a LCD (Liquid Crystal Display) device, an OLED (Organic Light Emitting Diode) device or a lamp. Further, the output device 210 may include a sound output device such as a speaker or a headphone. For example, the display device displays captured images, generated images and the like. On the other hand, the sound output device may convert sound data and the like into sound and outputs the sound.

The storage device 211 may include a device for data storage that is configured as an example of a storage unit of the mobile terminal 20 according to the embodiment. The storage device 211 may include a storage medium, a recording device that records data into the storage medium, a reading device that reads data from the storage medium, a deleting device that deletes data recorded in the storage medium and the like. The storage device 211 stores a program to be executed by the CPU 201 and various data.

The drive 212 may include a reader/writer for a storage medium, and it may be built in the mobile terminal 20 or attached externally. The drive 212 reads information that is recorded on a removable storage medium 24 such as a magnetic disk, an optical disk, a magneto-optical disk or a semiconductor memory which is attached thereto, and outputs the information to the RAM 203. Further, the drive 212 may write information into the removable storage medium 24.

The imaging device 213 may include an imaging optical system such as a taking lens or a zoom lens that condenses light, and a signal converter such as a CCD (Charge Coupled Device) or a CMOS (Complementary Metal Oxide Semiconductor). The imaging optical system condenses light emitted from a subject and forms a subject image on the signal converter, and the signal converter converts the formed subject image into an electrical image signal.

The communication device 215 may include a communication interface composed of a communication device or the like to make a connection with the network 12, for example. The communication device 215 may be a communication device compatible with a wireless LAN (Local Area Network), a communication device compatible with LTE (Long Term Evolution), or a wired communication device that makes wired communication.

Note that the network 12 may include a wired or wireless transmission channel of information transmitted from a device connected with the network 12. For example, the network 12 may include a public network such as the Internet, a telephone line network or a satellite communications network, various kinds of LAN (Local Area Network) including Ethernet (registered trademark), WAN (Wide Area Network) and the like. Further, the network 12 may include a leased line network such as IP-VPN (Internet Protocol-Virtual Private Network).

2. Description of Embodiments

The basic configuration of the AR system according to the present disclosure is described above by reference to FIGS. 1 to 4. Hereinafter, a first embodiment to a third embodiment of the present disclosure are described in detail by reference to FIGS. 5 to 19.

2-1. First Embodiment

Configuration of Mobile Terminal

Figure 5:
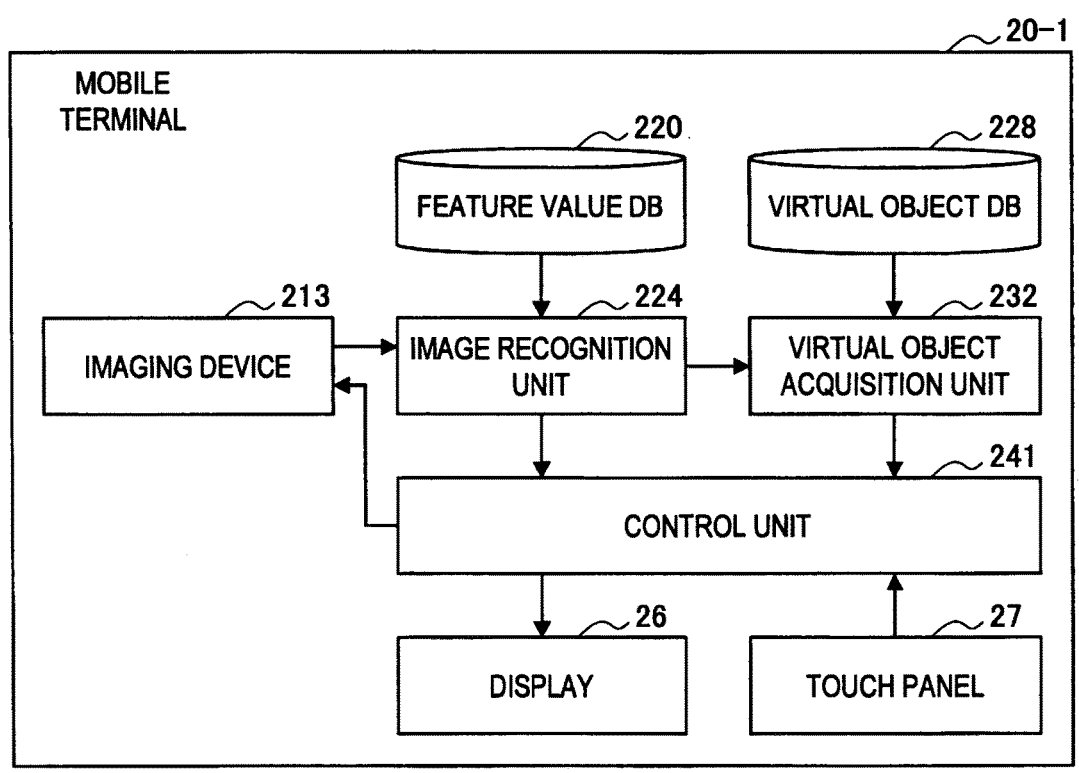
FIG. 5 is a block diagram showing a configuration of a mobile terminal according to a first embodiment.

FIG. 5 is a block diagram showing a configuration of a mobile terminal 20-1 according to the first embodiment. As shown in FIG. 5, the mobile terminal 20-1 according to the first embodiment may include a display 26, a touch panel 27, an imaging device 213, a feature value DB 220, an image recognition unit 224 (or, equivalently, a "determining unit"), a virtual object DB 228, a virtual object acquisition unit 232, and a control unit 241.

The display 26 may include a display module composed of LCD, OLED or the like. The display 26 displays various screens according to control by the control unit 241. For example, the display 26 displays a real space image being captured by the imaging device 213 and a virtual object added corresponding to a real object.

Further, although an example in which the display 26 is mounted as a part of the mobile terminal 20-1 is shown in FIG. 5, the display 26 may be a separate member from the mobile terminal 20-1. The display 26 may alternatively include a HMD (Head Mounted Display) that is mounted on the head of a user.

The touch panel 27 may include an operation detection unit that is mounted onto the display 26. The touch panel 27 can detect the closeness or contact of an operating body such as a user's finger or a touch pen. Note that the touch panel 27 is just an example of an operation detection unit, and the mobile terminal 20-1 may include another component for operation, such as a keyboard and a button.

The imaging device 213 may include an imaging optical system and a signal converter as described above with reference to FIG. 4, and captures real space images (moving images or still images) according to control by the control unit 241. Note that the imaging device 213 may include a component for imaging of moving images and a component for imaging of still images separately.

The feature value DB 220 may include a database that stores feature value data of images of real objects. Specifically, in the feature value DB 220, identification information for identifying each real object and feature value data of each real object are associated with each other. The feature value data may be a set of feature values determined from learning images of real objects using SIFT or Random Ferns, for example.

The image recognition unit 224 may recognize a real object contained in the real space image captured by the imaging device 213, and the position and posture of the real object in the real space image. For example, the image recognition unit 224 recognizes a real object contained in the real space image by checking a feature value determined from the real space image against the feature value of each real object stored in the feature value DB 220. Specifically, the image recognition unit 224 determines a feature value of a real object in the real space image according to a feature value determination method such as SIFT or Random Ferns, and checks the determined feature value against the feature value of each real object stored in the database 220. Then, the image recognition unit 224 recognizes the identification information of the real object associated with the feature value which matches the feature value of the real object in the real space image, and may determine or recognize a position and posture of the real object in the real space image.

Note that the image recognition unit 224 may recognize a real object such as a known figure or symbol, an artificial marker (e.g., a bar code or a QR code) or a natural marker and recognize the position and posture of the real object based on the size and shape of the real object in the real space image.

Further, although an example in which a real object contained in a real space image is recognized by image processing is described above, a method of recognizing a real object is not limited to the image processing. For example, it is feasible to detect the direction toward which the imaging device 213 is pointed and the current position of the mobile terminal 20-1, and estimate a real object contained in a real space image and the position and posture of the real object in the real space image based on the detection result.

The virtual object DB 228 may include a database that stores virtual objects to be added to real objects. Specifically, in the virtual object DB 228, identification information of a virtual object, identification information of a real object, setting information indicating a display position relative to a real object, and a virtual object to be presented to a user are associated with one another. The virtual object is the label graphic 50 as described earlier by reference to FIG. 2, for example; however, the label graphic 50 is just an example of the virtual object. The virtual object may be in text format or image format.

The virtual object acquisition unit 232 may acquire the virtual object and the setting information corresponding to the real object recognized by the image recognition unit 224. For example, the virtual object acquisition unit 232 acquires the virtual object and the setting information associated with the identification information of the real object recognized by the image recognition unit 224 from the virtual object DB 228.

The control unit 241 may control the overall operation of the mobile terminal 20-1. For example, the control unit 241 adds the virtual object acquired by the virtual object acquisition unit 232 to the real space image and displays the real space image with the virtual object added on the display 26.

The control unit 241 may change the posture (or, equivalently, the "orientation") of the virtual object relative to the real object depending on the posture of the real object in the real space image. For example, depending on a rotation angle of the plane of the real object around the axis intersecting with the imaging optical axis of the real space image, the control unit 241 adds the virtual object to a plane (which includes a flat plane and a curved plane; the same applies to the word "plane" below) identical to the plane of the real object, a plane parallel to the plane of the real object, a plane in a given relationship with the plane of the real object, a plane different from the plane of the real object and the like.

Specifically, in the case where the above-described rotation angle around the axis with reference to the front-facing state of a real object is less than a value, the control unit 241 may add the virtual object onto a plane which is identical or parallel to the plane of the real object. On the other hand, in the case where the above-described rotation angle around the axis with reference to the front-facing state is equal to or greater than the value, the control unit 241 may add the virtual object onto a plane which is different from the plane of the real object. Such function of the control unit 241 is described in detail hereinbelow.

(Front-Facing State)

First, the front-facing state of a real object is described by reference to FIG. 6. FIG. 6 is a view showing the front-facing state of a real object. Note that the z-axis used in this specification is an imaging optical axis of a real space image, the x-axis is an axis along the horizontal direction of a real space image, the y-axis is an axis along the vertical direction of a real space image, and the x-axis, the y-axis and the z-axis are orthogonal to one another.

As shown in FIG. 6, the front-facing state is a state where the plane of the real object 40 is orthogonal to the z-axis, which is the imaging optical axis. Note that the plane of the real object 40 shown in FIG. 6 may be different from the actual plane of the real object 40, and it may be a plane previously defined for the real object 40. The rotation axis of the plane of the real object 40 with reference to the front-facing state is discussed hereinbelow. However, the state serving as a reference for the rotation axis is not limited to the front-facing state, and another posture of the real object may be treated as the reference state.

(Rotation Angle α Around the Y-Axis)

FIG. 7 is a view showing a state where the plane of the real object 40 has rotated around the y-axis. In this specification, the rotation angle of the plane of the real object 40 around the y-axis with reference to the front-facing state is referred to as a as shown in FIG. 7.

(Display Control Based on the Rotation Angle α)

In the case where the rotation angle α is less than a value, the control unit 241 may add a label graphic, which is the virtual object, onto a plane which is identical or parallel to the plane of the real object. On the other hand, in the case where the rotation angle α is equal to or greater than the value, the control unit 241 may add a label graphic onto a plane which is different from the plane of the real object. This is specifically described hereinafter by reference to FIGS. 8 to 10.

Figure 8:
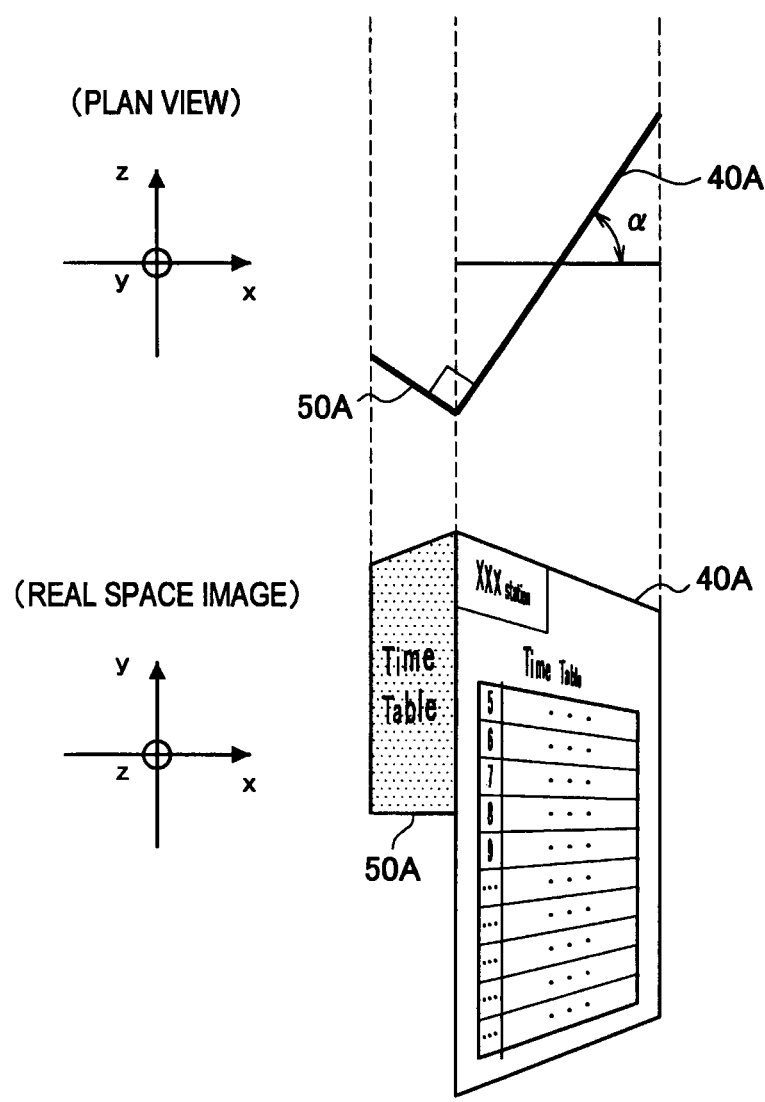
FIG. 8 is a view showing an example of addition of a label graphic to a real space image according to the first embodiment.

FIG. 8 is a view showing an example of addition of a label graphic to a real space image according to the first embodiment. As shown in FIG. 8, when the rotation angle α of the time table 40A is equal to or greater than a value, the control unit 241 may add a label graphic 50A onto a plane orthogonal to the time table 40A (i.e. a plane oriented at 90 degrees or 270 degrees with respect to the time table 40A on the x-z plane). In this configuration, it is possible to reduce the inclination with reference to the front-facing state as well as increasing the display area of the label graphic 50A, and thus the visibility of the label graphic 50A can be increased.

Further, by adding the virtual object such as the label graphic 50A to the position that does not overlap the real object as shown in FIG. 8, the visibility of the real object can be increased.

Note that, when the control unit 241 changes the relative posture of the label graphic 50A since the rotation angle α of the real object becomes greater than a value, the control unit 241 may represent the process of change in posture using animation so that a user can recognize the change.

Figure 9:
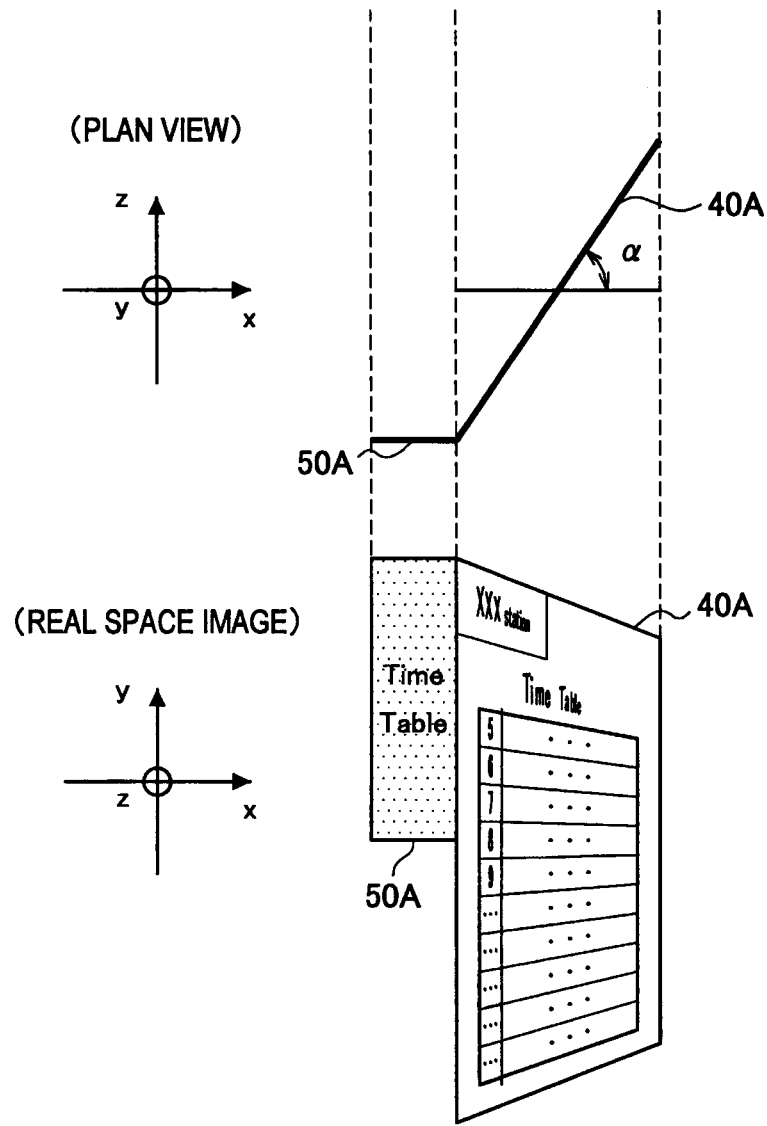
FIG. 9 is a view showing another example of addition of a label graphic to a real space image according to the first embodiment.

FIG. 9 is a view showing another example of addition of a label graphic to a real space image according to the first embodiment. As shown in FIG. 9, when the rotation angle α of the time table 40A is equal to or greater than a value, the control unit 241 may add the label graphic 50A onto a plane orthogonal to the z-axis, which is the imaging optical axis (i.e. the x-y plane). In this configuration also, the visibility of the label graphic 50A can be increased.

Figure 10:
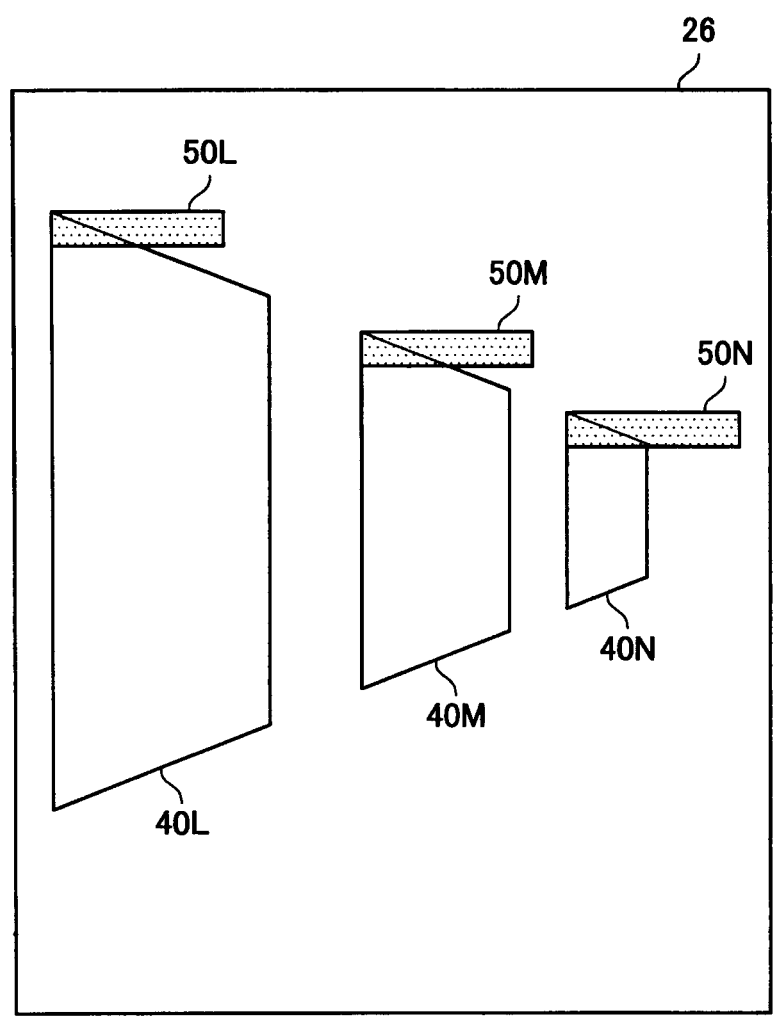
FIG. 10 is a view showing addition of a label graphic when there are a plurality of real objects.

Note that, when a plurality of real objects 40L, 40M and 40N are contained in a real space image as shown in FIG. 10, the control unit 241 may add label graphics 50L, 50M and 50N respectively corresponding to the real objects 40 so that the label graphics 50 do not overlap. In this configuration, the visibility of the label graphics 50 can be increased.

Although the display control in the case where the plane of the real object 40 has rotated around the y-axis is described above by reference to FIGS. 7 to 10, the display control can be performed in the same manner also in the case where the plane of the real object 40 has rotated around the x-axis.

(Rotation Angle β Around the X-Axis)

Figure 11:
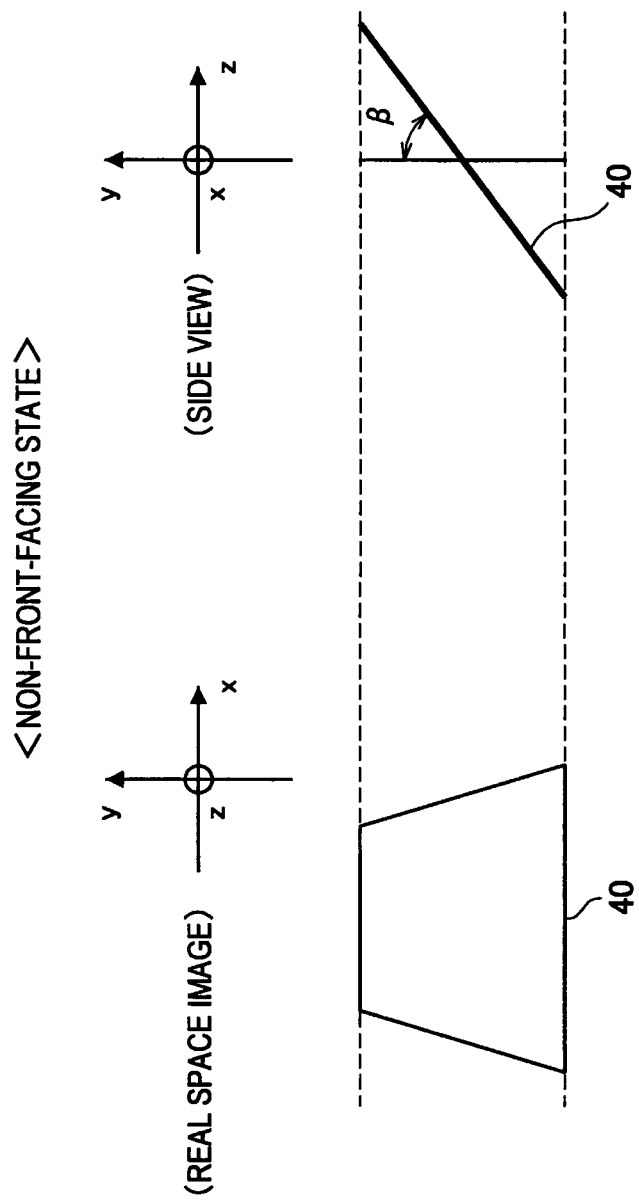
FIG. 11 is a view showing a state where a plane of a real object has rotated around the x-axis.

FIG. 11 is a view showing a state where the plane of the real object 40 has rotated around the x-axis. In this specification, the rotation angle of the plane of the real object 40 around the x-axis with reference to the front-facing state is referred to as β as shown in FIG. 11.

(Display Control Based on the Rotation Angle β)

In the case where the rotation angle β is less than a value (which may be the same as or different from the value for the rotation angle α), the control unit 241 may add a label graphic onto a plane which is identical or parallel to the plane of the real object. On the other hand, in the case where the rotation angle β is equal to or greater than the value, the control unit 241 may add a label graphic onto a plane which is different from the plane of the real object. This is specifically described hereinafter by reference to FIG. 12.

Figure 12:
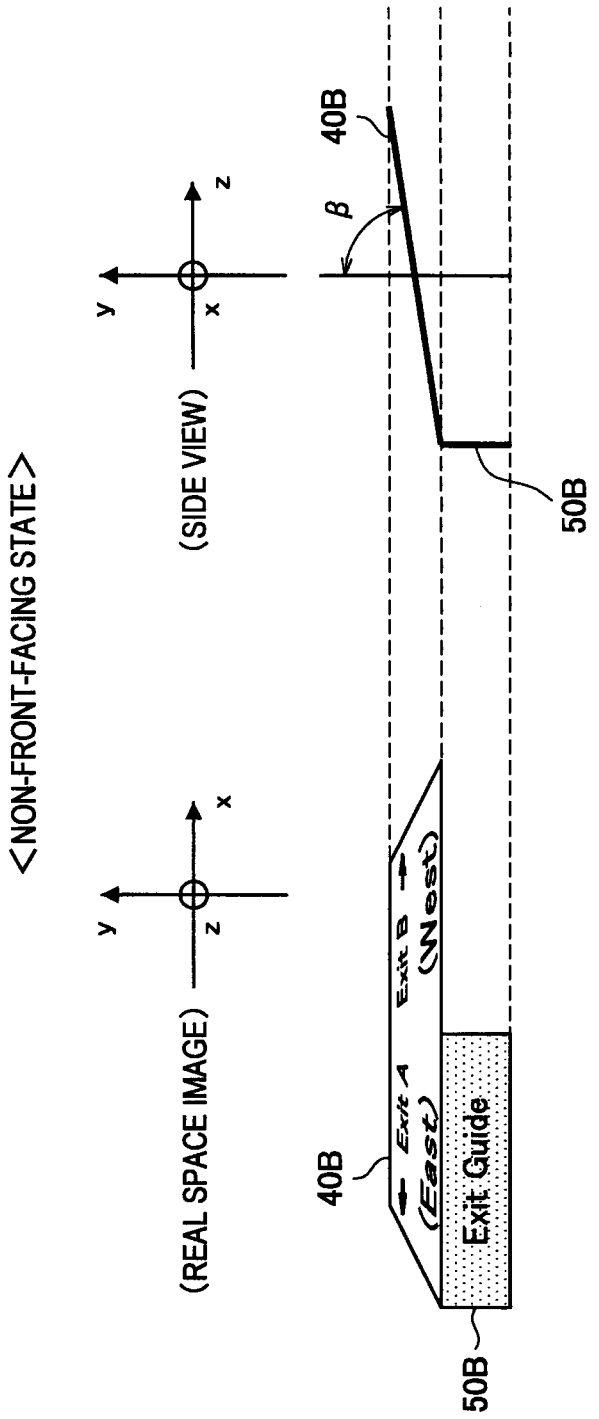
FIG. 12 is a view showing an example of addition of a label graphic to a real space image according to the first embodiment.

FIG. 12 is a view showing an example of addition of a label graphic to a real space image according to the first embodiment. As shown in FIG. 12, when the rotation angle β of the exit guide 40B is equal to or greater than a value, the control unit 241 may add a label graphic 50B onto a plane orthogonal to the z-axis, which is the imaging optical axis (i.e. the x-y plane). In this configuration, it is possible to display the label graphic 50B in the front-facing state as well as increasing the display area of the label graphic 50B, and thus the visibility of the label graphic 50B can be increased.

Note that, when the rotation angle β of the exit guide 40B is equal to or greater than a value, the control unit 241 may add the label graphic 50B onto a plane orthogonal to the exit guide 40B (i.e. a plane oriented at 90 degrees or 270 degrees with respect to the exit guide 40B on the y-z plane). In this configuration also, the visibility of the label graphic 50B can be increased.

There may be cases where a real object that has been recognizable in a real space image becomes not recognizable due to a change in the positional relationship with the mobile terminal 20-1. For example, when the plane of the real object 40A shown in FIG. 8 further rotates around the y-axis in a counterclockwise direction, the plane of the real object 40A may no longer be contained in the real space image, and therefore the image recognition unit 224 can no longer recognize the real object 40A. As a result, the label graphic disappears from the screen.

It is, however, considered that, as the recognition of a real object displayed on a real space image becomes more difficult, the significance of notifying a user of information about the real object is higher. Thus, when a real object that has been recognizable becomes not recognizable, the control unit 241 may maintain a label graphic corresponding to the real object based on the previous recognition result. For example, the control unit 241 may maintain the label graphic for a certain period of time in the position and posture corresponding to the position and posture of the real object immediately before when the real object has become not recognizable. In this configuration, it is possible to notify a user of information about the real object which is difficult to view in the real space image.

Rotation Angle Noted by the Control Unit

Although the example in which the control unit 241 changes the posture of the label graphic relative to the real object when any of the rotation angle α around the y-axis and the rotation angle β around the x-axis is equal to or greater than a value is described above, the present technology is not limited thereto. There are cases where the effect imposed on the visibility and operability of a label graphic is small even when the rotation angle around a certain coordinate axis is large, in some position or orientation of the label graphic added. For example, in the case where the label graphic 50A is added on the side along the y-axis direction of the real object 40A as shown in FIG. 2, the effect of the rotation angle of the real object 40A around the x-axis on the visibility of the label graphic 50A is relatively small.

Thus, the control unit 241 may pay attention to a coordinate axis along the direction of the side to which a label graphic is added when the plane of the real object is in the front-facing state, and control the posture of the label graphic depending on whether the rotation angle around the coordinate axis is equal to or greater than a value. For example, because the label graphic 50B shown in FIG. 12 is added to the side along the x-axis direction when the plane of the exit guide 40B is in the front-facing state, the control unit 241 may pay attention only to the rotation angle around the x-axis for the posture control of the label graphic 50B. Note that the posture of the real object 40A can be represented by each component, such as the rotation angle around the x-axis, the rotation angle around the y-axis, and the rotation angle around the z-axis.

Operation of Mobile Terminal

The configuration of the mobile terminal 20-1 according to the first embodiment is described above by reference to FIGS. 5 to 12. Hereinafter, the operation of the mobile terminal 20-1 according to the first embodiment is described by reference to FIG. 13.

Figure 13:
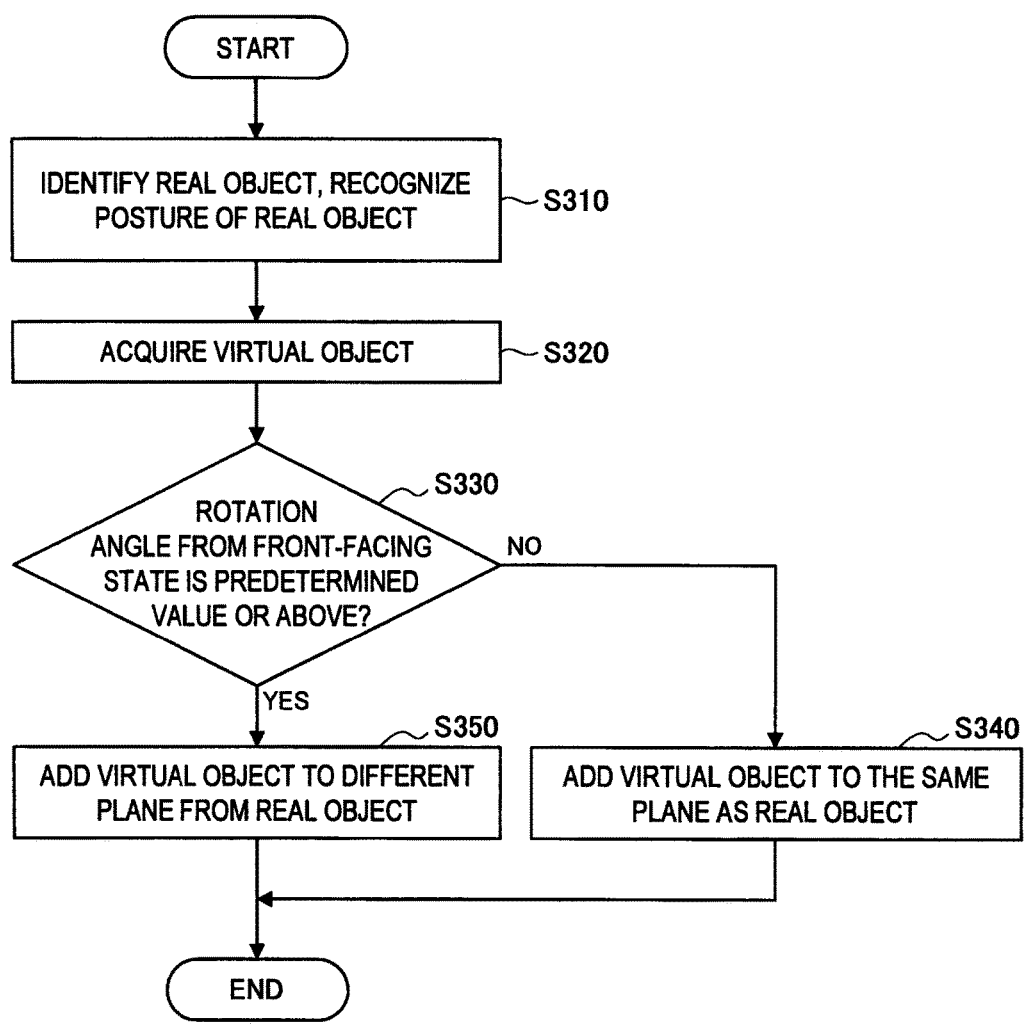
FIG. 13 is a flowchart showing an operation of a mobile terminal according to the first embodiment.

FIG. 13 is a flowchart showing the operation of the mobile terminal 20-1 according to the first embodiment. As shown in FIG. 13, when a real space image is captured by the imaging device 213, the image recognition unit 224 identifies a real object contained in the real space image and recognizes the position, posture, scale and the like of the real object (S310).

Next, the virtual object acquisition unit 232 acquires a virtual object corresponding to the real object based on the recognition result by the image recognition unit 224 (S320).

After that, the control unit 241 determines whether the rotation angle with reference to the front-facing state of the real object recognized by the image recognition unit 224 is equal to or greater than a value (S330). When the rotation angle is less than the value (NO in S330), the control unit 241 adds the virtual object onto a plane which is identical or parallel to the plane of the real object (S340).

On the other hand, when the rotation angle is equal to or greater than the value (YES in S330), the control unit 241 adds the virtual object onto a plane which is different from the plane of the real object (S350). For example, when the rotation angle is equal to or greater than the value (YES in S330), the control unit 241 may add the virtual object onto a plane orthogonal to the z-axis, which is the imaging optical axis. In this configuration, the virtual object can be displayed in the front-facing state, and it is thus possible to improve the visibility of the label graphic 50B.

2-2. Second Embodiment

The first embodiment of the present disclosure is described above by reference to FIGS. 5 to 13. Hereinafter, a second embodiment of the present disclosure is described by reference to FIGS. 14 to 18. In the second embodiment of the present disclosure, a display method of a virtual object in the case where a real object has a plurality of planes is proposed.

(AR System According to the Second Embodiment)

Figure 14:
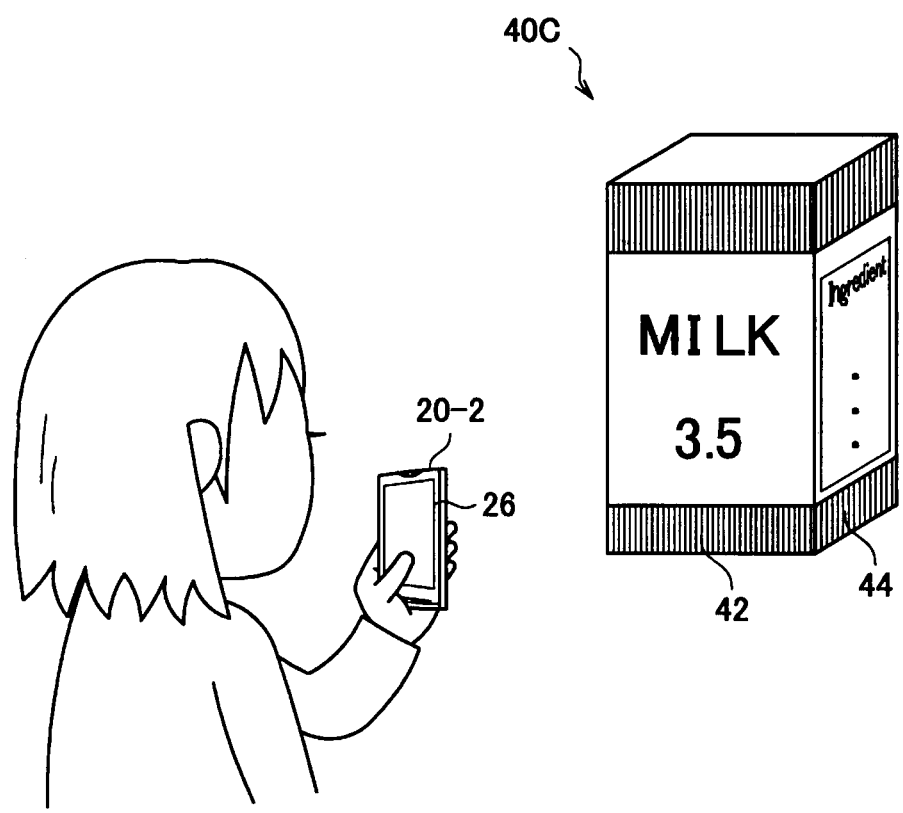
FIG. 14 is a view showing a configuration of an AR system according to a second embodiment of the present disclosure.

FIG. 14 is a view showing a configuration of an AR system according to a second embodiment of the present disclosure. The AR system according to the second embodiment includes a mobile terminal 20-2, and it is applied to the case where the mobile terminal 20-2 captures an image of a real object having a plurality of planes such as a milk carton 40C as shown in FIG. 14. The milk carton 40C shown in FIG. 14 has a first plane 42 on which a trade name is printed and a second plane 44 on which ingredients are printed as a plurality of planes.

(Configuration of the Mobile Terminal According to the Second Embodiment)

Figure 15:
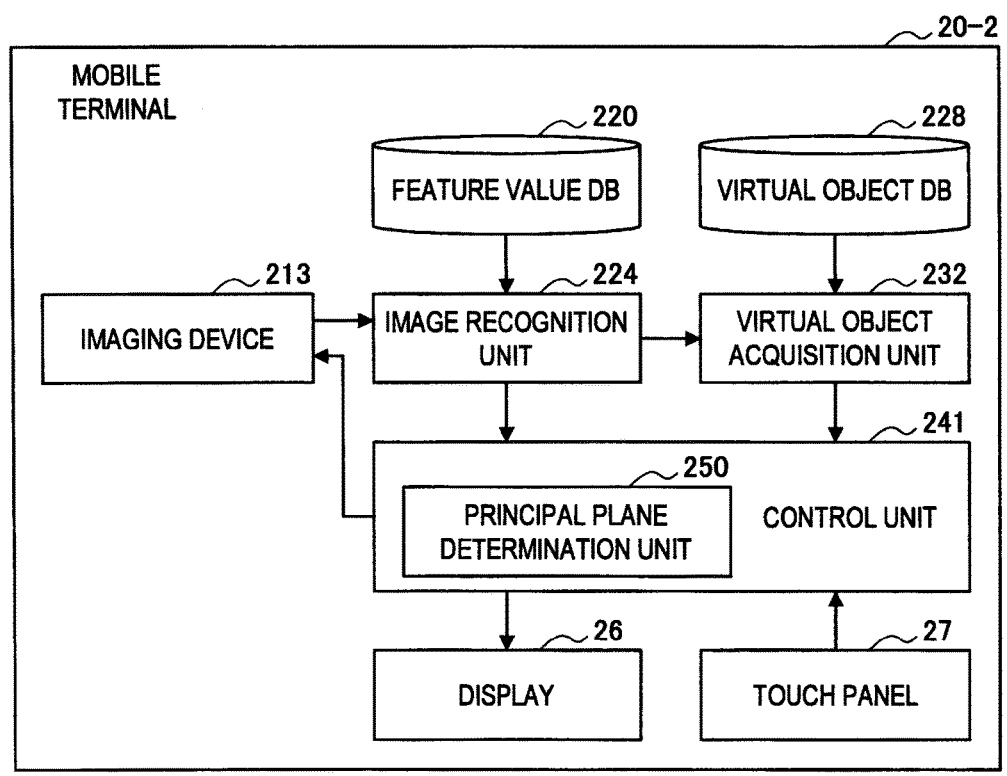
FIG. 15 is a block diagram showing a configuration of a mobile terminal according to the second embodiment of the present disclosure.

FIG. 15 a block diagram showing a configuration of the mobile terminal 20-2 according to the second embodiment. As shown in FIG. 15, the mobile terminal 20-2 according to the second embodiment includes a display 26, a touch panel 27, an imaging device 213, a feature value DB 220, an image recognition unit 224, a virtual object DB 228, a virtual object acquisition unit 232, and a control unit 242. The functions of the display 26, the touch panel 27, the imaging device 213, the feature value DB 220, the image recognition unit 224, the virtual object DB 228, and the virtual object acquisition unit 232 are the same as those described in the first embodiment, and the elements different from those in the first embodiment are mainly described below.

The control unit 242 has a function of a principal plane determination unit 250 and a function of adding a virtual object in a posture according to a determination result by the principal plane determination unit 250, in addition to all or some of the functions of the control unit 241 according to the first embodiment.

When a real object contained in a real space image has a plurality of planes, the principal plane determination unit 250 determines a principal plane among the plurality of planes. For example, the principal plane determination unit 250 may determine a plane having the largest recognition area by the image recognition unit 224 among the plurality of planes as the principal plane. Alternatively, the principal plane determination unit 250 may determine a plane having the highest orthogonality with respect to the z-axis, which is the imaging optical axis (a plane which is the closest to the front-facing state), among the plurality of planes as the principal plane. Further, the principal plane may be previously defined for each real object.

The control unit 242 adds a label graphic (virtual object) corresponding to the real object to the principal plane determined by the principal plane determination unit 250. This is specifically described hereinafter by reference to FIG. 16.

Figure 16:
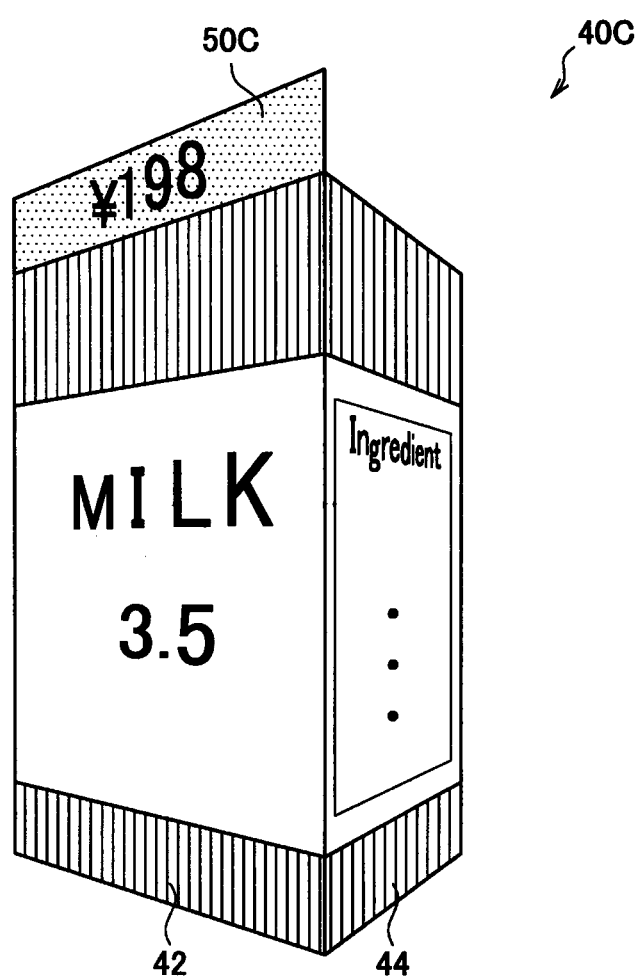
FIG. 16 is a view showing an example of addition of a label graphic to a real space image according to the second embodiment.

FIG. 16 is a view showing an example of addition of a label graphic to a real space image according to the second embodiment. In the real space image shown in FIG. 16, the first plane 42 of the milk carton 40C has a larger recognition area than the second plane 44 and it is closer to the front-facing state. Therefore, the principal plane determination unit 250 determines the first plane 42, among the first plane 42 and the second plane 44 of the milk carton 40C, as the principal plane.

Consequently, the control unit 242 adds the label graphic 50C to the first plane 42 which is determined as the principal plane by the principal plane determination unit 250. Note that, although the label graphic 50C is price display in the example of FIG. 16, the label graphic 50C is not limited to price display. The label graphic 50C may be any information associated with the milk carton 40C including expiration date information, coupon information and advertisement information, for example.

Figure 17:
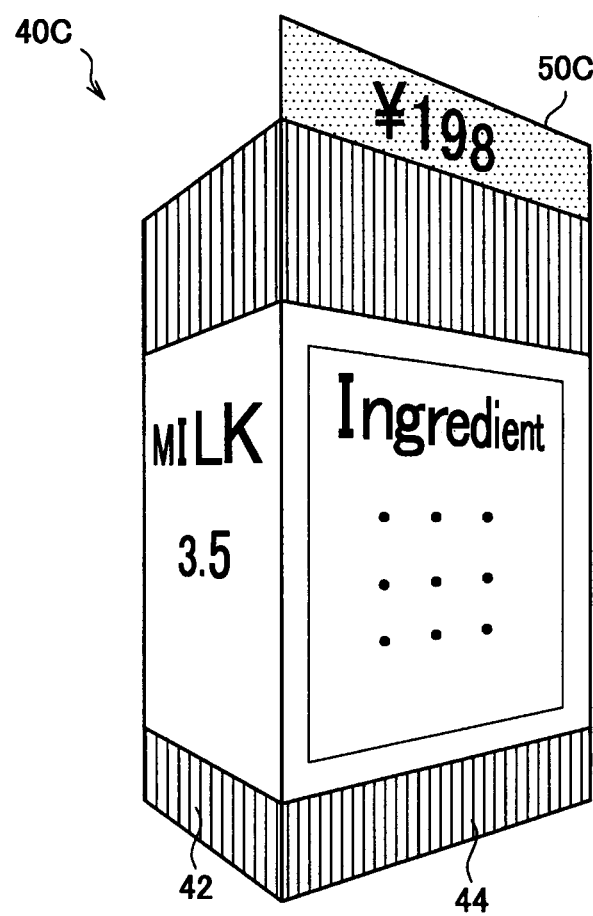
FIG. 17 is a view showing an example of addition of a label graphic to another real space image according to the second embodiment.

FIG. 17 is a view showing an example of addition of a label graphic to another real space image according to the second embodiment. In the real space image shown in FIG. 17, the second plane 44 of the milk carton 40C has a larger recognition area than the first plane 42 and it is closer to the front-facing state. Therefore, the principal plane determination unit 250 determines the second plane 44, among the first plane 42 and the second plane 44 of the milk carton 40C, as the principal plane.

Consequently, the control unit 242 adds the label graphic 50C to the second plane 44 which is determined as the principal plane by the principal plane determination unit 250. Note that, as shown in FIGS. 16 and 17, the posture of the label graphic 50C relative to the milk carton 40C changes depending on the plane to which the label graphic 50C is added.

Although the example in which the same label graphic is added no matter which plane is the principal plane is described above, the embodiment is not limited thereto. As another example, a label graphic may be associated with each plane of a real object in the virtual object DB 228, and, in this case, the control unit 242 may add a different label graphic depending on the principal plane as shown in FIG. 18.

Figure 18:
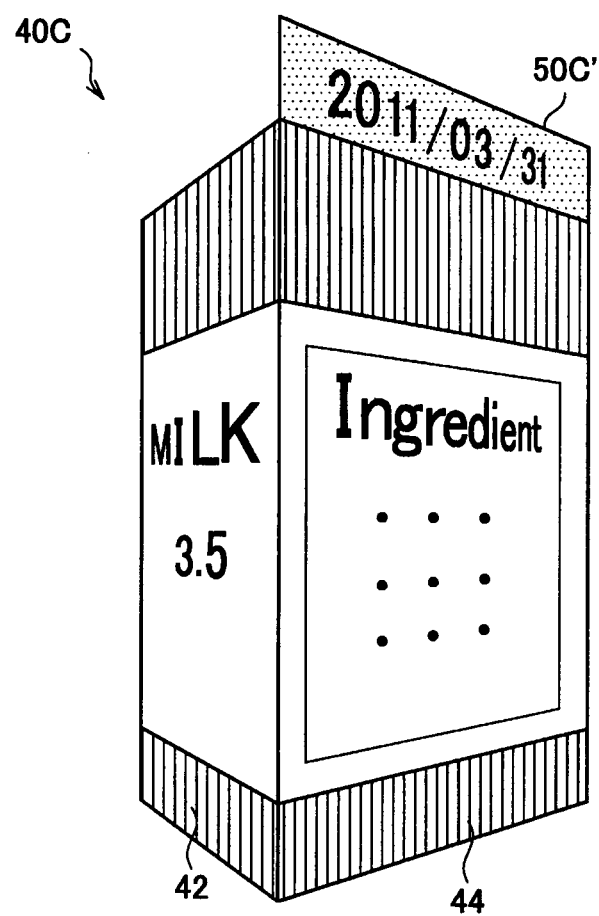
FIG. 18 is a view showing an example of addition of a label graphic to a real space image according to an alternative example of the second embodiment.

FIG. 18 is a view showing an example of addition of a label graphic to a real space image according to an alternative example of the second embodiment. As shown in FIG. 18, when the second plane 44 is the principal plane, the control unit 242 may add a label graphic 50C' indicating expiration date, which is different from the label graphic 50C added when the first plane 42 is the principal plane, to the second plane 44. In this configuration, a variety of information can be presented to a user depending on the angle of imaging a real object.

To the same effect, the control unit 242 may add a label graphic corresponding to each plane to all of a plurality of planes. Further, the control unit 242 may change the posture of the label graphic 50C relative to the milk carton 40C depending on the rotation angle of the plane to which the label graphic 50C is added.

2-3. Third Embodiment

The second embodiment of the present disclosure is described above. Hereinafter, a third embodiment of the present disclosure is described. Although the example in which a single mobile terminal constitutes AR is described in the first and second embodiments, a mobile terminal and a server installed on the network side may constitute AR in combination as the third embodiment of the present disclosure.

FIG. 19 is a view showing a configuration of an AR system according to the third embodiment. As shown in FIG. 19, the AR system according to the third embodiment includes a mobile terminal 20-3, a network 12, and an AR server 30.

According to the third embodiment, cloud computing can be implemented by incorporating some of the functions for AR into the AR server 30. For example, the functions of the virtual object DB and the virtual object acquisition unit may be incorporated into the AR server 30. In this case, the mobile terminal 20-3 can receive a virtual object corresponding to a real object from the AR server 30 by transmitting a recognition result of a real object as a request for acquisition of a virtual object to the AR server 30.

Further, the functions of the image recognition unit and the feature value DB may be also incorporated into the AR server 30. In this case, the mobile terminal 20-3 may transmit an image captured by the imaging device 213 to the AR server 30, and the AR server 30 may perform recognition of a real object and acquisition of a virtual object and then transmit the virtual object to the mobile terminal 20-3.

Furthermore, the function of adding a virtual object to a real space image may be incorporated into the AR server 30. In this case, the mobile terminal 20-3 may transmit a real space image captured by the imaging device 213 to the AR server 30, and the AR server 30 may perform recognition of a real object, acquisition of a virtual object and addition of the virtual object, and then transmit the real space image with the virtual object added to the mobile terminal 20-3. In the case of incorporating the function of adding a virtual object to a real space image into the AR server 30, the AR server 30 serves as a display control device.

3. Summary

As described above, the mobile terminal 20 according to the embodiments of the present disclosure adds a label graphic to a plane identical to the plane of a real object or a plane different from the plane of a real object depending on the posture of the real object in a real space image. In this configuration, it is possible to improve the visibility and operability of the label graphic.

Although preferred embodiments of the present disclosure are described above with reference to the appended drawings, the present disclosure is not limited thereto. It should be understood by those skilled in the art that various modifications, combinations, sub-combinations and alterations may occur depending on design requirements and other factors insofar as they are within the scope of the appended claims or the equivalents thereof.

For example, it is not always necessary to perform the steps in the processing of the mobile terminal 20 in this specification in chronological order according to the sequence shown in the flowcharts. For example, the steps in the processing of the mobile terminal 20 may be processed in a sequence different from the sequence shown in the flowchart or processed in parallel.

Furthermore, it is feasible to create a computer program that causes hardware such a CPU, ROM and RAM incorporated into the mobile terminal 20 or the AR server 30 to perform the equal functions to the elements of the mobile terminal 20 or the AR server 30 described above. Further, a storage medium in which such a computer program is stored may be also provided.

Additionally, the present technology may also be configured as below.

(1)
A display control device including:
a control unit that controls display of a virtual object corresponding to a real object contained in a real space image,
wherein the control unit changes a posture of the virtual object relative to the real object depending on a posture of the real object in the real space image.

(2)
The display control device according to (1),
wherein the control unit adds the virtual object to a plane identical to a plane of the real object, a plane parallel to the plane of the real object, a plane in a given relationship with the plane of the real object, or a plane different from the plane of the real object depending on a posture of the real object in the real space image.

(3)
The display control device according to (1) or (2),
wherein the control unit adds the virtual object to a plane of the real object in a relative posture depending on a rotation angle of the plane of the real object around an intersecting axis with an imaging optical axis of the real space image.

(4)
The display control device according to (3),
wherein the control unit adds the virtual object to a plane identical or parallel to the plane of the real object when the rotation angle around the intersecting axis with reference to a front-facing state where the plane of the real object is orthogonal to the imaging optical axis is less than a predetermined value, and adds the virtual object to a plane different from the plane of the real object when the rotation angle around the intersecting axis with reference to the front-facing state is equal to or greater than the predetermined value.

(5)
The display control device according to (4),
wherein the control unit adds the virtual object to a plane orthogonal to the plane of the real object or a plane orthogonal to the imaging optical axis when the rotation angle around the intersecting axis with reference to the front-facing state is equal to or greater than a predetermined value.

(6)
The display control device according to any one of (3) to (5),
wherein the virtual object is added to correspond to any side constituting the plane of the real object, and
wherein the intersecting axis is an axis along a direction of a side to which the virtual object is added when the plane of the real object is in the front-facing state.

(7)
The display control device according to any one of (1) to (6),
wherein the control unit adds the virtual object to a position not overlapping the real object.

(8)
The display control device according to any one of (1) to (7),
wherein when a plurality of real objects are contained in a real space image, the control unit adds each virtual object in such a way that virtual objects respectively corresponding to the plurality of real objects do not overlap.

(9)
The display control device according to any one of (1) to (8),
wherein when the control unit changes a relative posture of the virtual object, the control unit displays a process of change on a display device.

(10)
The display control device according to any one of (1) to (9),
wherein when a plurality of planes are detected from the real object, the control unit adds the virtual object to a principal plane among the plurality of planes.

(11)
The display control device according to (10), wherein the control unit adds a different virtual object to the principal plane depending on a plane serving as the principal plane.

(12)
The display control device according to (10), wherein the principal plane is a plane having highest orthogonality with respect to the imaging optical axis among the plurality of planes.

(13)
The display control device according to (10), wherein the principal plane is a plane having a largest recognition area in the real space image among the plurality of planes.

(14)
The display control device according to (10), wherein the principal plane is a plane previously defined among the plurality of planes.

(15)
A display control method comprising:
changing a posture of a virtual object corresponding to a real object contained in a real space image relative to the real object depending on a posture of the real object in the real space image.

(16)
A program causing a computer to function as:
a control unit that controls display of a virtual object corresponding to a real object contained in a real space image, and changes a posture of the virtual object relative to the real object depending on a posture of the real object in the real space image.

(17)
The program according to (16), wherein the control unit adds the virtual object to a plane identical to a plane of the real object, a plane parallel to the plane of the real object, a plane in a given relationship with the plane of the real object, or a plane different from the plane of the real object depending on a posture of the real object in the real space image.

(18)
The program according to (16) or (17), wherein the control unit adds the virtual object to a plane of the real object in a relative posture depending on a rotation angle of the plane of the real object around an intersecting axis with an imaging optical axis of the real space image.

(19)
The program according to (18), wherein the control unit adds the virtual object to a plane identical or parallel to the plane of the real object when the rotation angle around the intersecting axis with reference to a front-facing state where the plane of the real object is orthogonal to the imaging optical axis is less than a predetermined value, and adds the virtual object to a plane different from the plane of the real object when the rotation angle around the intersecting axis with reference to the front-facing state is equal to or greater than the predetermined value.

(20)
The program according to any one of (16) to (19), wherein when a plurality of planes are detected from the real object, the control unit adds the virtual object to a principal plane among the plurality of planes.

The present disclosure contains subject matter related to that disclosed in Japanese Priority Patent Application JP 2011-086679 filed in the Japan Patent Office on Apr. 8, 2011, the entire content of which is hereby incorporated by reference.

What is claimed is:

1. A display control device comprising:
a determining unit configured to determine a principal surface of a real object and to calculate an orientation angle of the principal surface of the real object in a real space image in relation to an optical axis of a real space image, wherein the real space image is captured by an imaging device; and
a control unit configured to:
select between a first virtual object orientation and a second virtual object orientation of a virtual object based on the calculated orientation angle of the principal surface of the real object, wherein the first virtual object orientation is on substantially the same plane as the principal surface of the real object in the real space image and is selected when the calculated orientation angle of the principal surface of the real object is less than an angular threshold value, and wherein the second virtual object orientation is in a different plane than the principal surface of the real object in the real space image and is selected when the calculated orientation angle of the principal surface of the real object is greater than or equal to the angular threshold value; and
output an image on a display device of the virtual object with the selected orientation at least partially superimposed on the real object, wherein the real object is a three-dimensional object comprising a plurality of surfaces from which the principal surface of the real object is determined, and wherein the determining unit and the control unit are each implemented via at least one processor.

2. The device of claim 1, wherein selecting between the first virtual object orientation and the second virtual object orientation comprises aligning the virtual object image with the orientation of the principal surface of the real object further by aligning the virtual object with a first plane associated with the principal surface of the real object.

3. The device of claim 2, wherein the first plane associated with the principal surface of the real object is at least one of:
oriented at a predetermined angle with respect to the principal surface of the real object;
curved with respect to the principal surface of the real object;
parallel to the principal surface of the real object; or
co-planar with the principal surface of the real object.

4. The device of claim 2 further configured to select the first plane associated with the principal surface of the real object from a plurality of planes associated with the real object based at least in part on an angle between the first plane and the optical axis of the real space image.

5. The device of claim 2, wherein a display unit displays the virtual object image along a side of the real object parallel to the first plane associated with the principal surface of the real object.

6. The device of claim 2, wherein a display unit displays the virtual object image such that the virtual object image does not overlap with the real object in the image of real space.

7. The device of claim 2, wherein:
the real object comprises a first real object including a first principal surface and a second real object including a second principal surface;

the virtual object comprises a first label graphic and a second label graphic, the first label graphic is associated with the first principal surface of the first real object in the image of real space;

the second label graphic is associated with the second principal surface of the second real object in the image of real space; and the first label graphic positioned such that the first label graphic does not overlap with the second label graphic.

8. The device of claim 2 further configured to select the first plane associated with the principal surface of the real object from a plurality of planes associated with the real object.

9. The device of claim 8, wherein the first plane associated with the principal surface of the real object is the plane which is closest to a front-facing state with respect to the imaging device.

10. The device of claim 8, wherein the virtual object comprises a label graphic.

11. The device of claim 10, wherein a content of the label graphic is chosen based on the selection of the first plane associated with the principal surface of the real object.

12. The device of claim 8, wherein the first plane associated with the principal surface of the real object is the plane among the plurality of planes with a closest in orthogonal orientation with respect to the optical axis of the real space image.

13. The device of claim 8, wherein the first plane associated with the principal surface of the real object is the plane among the plurality of planes with which the alignment of the virtual object will result in a largest image recognition area.

14. The device of claim 8, wherein selecting the first plane associated with the principal surface of the real object is based on a type of the real object.

15. The device of claim 1, wherein the first plane associated with the principal surface of the real object is parallel to the principal surface of the real object.

16. The device of claim 15, wherein the second virtual object orientation aligns the virtual object with a second plane that is one of orthogonal to the principal surface of the real object or orthogonal to the optical axis of the real space image.

17. The device of claim 1, wherein outputting an image of the virtual object comprises outputting an animation of a transition from the first virtual object orientation to the second virtual object orientation.

18. A method, implemented via at least one processor, the method comprising:

determining a principal surface of a real object and calculating an orientation angle of the principal surface of the real object in relation to an optical axis of a real space image, wherein the real space image is captured by an imaging device;

selecting between a first virtual object orientation and a second virtual object orientation of a virtual object based on the calculated orientation angle of the principal surface of the real object, wherein the first virtual object orientation is on substantially the same plane as the principal surface of the real object in the real space image and is selected when the calculated orientation angle of the principal surface of the real object is less than an angular threshold value, and the second virtual object orientation is in a different plane than the principal surface of the real object in the real space image and is selected when the calculated orientation angle of the principal surface of the real object is greater than or equal to the angular threshold value; and outputting an image on a display device of the virtual object with the selected orientation at least partially superimposed on the real object, wherein the real object is a three-dimensional object comprising a plurality of surfaces from which the principal surface of the real object is determined.

19. A non-transitory computer-readable medium having embodied thereon a program, which when executed by a processor causes the processor to perform a method, the method comprising:

determining a principal surface of a real object and calculating an orientation angle of the principal surface of the real object in relation to an optical axis of a real space image, wherein the real space image is captured by an imaging device;

selecting between a first virtual object orientation and a second virtual object orientation of a virtual object based on the calculated orientation angle of the principal surface of the real object, wherein the first virtual object orientation is on substantially the same plane as the principal surface of the real object in the real space image and is selected when the calculated orientation angle of the principal surface of the real object is less than an angular threshold value, and the second virtual object orientation is in a different plane than the principal surface of the real object in the real space image and is selected when the calculated orientation angle of the principal surface of the real object is greater than or equal to the angular threshold value; and outputting an image on a display device of the virtual object with the selected orientation at least partially superimposed on the real object, wherein the real object is a three-dimensional object comprising a plurality of surfaces from which the principal surface of the real object is determined.

* * * * *